United States Patent
Kohl et al.

(10) Patent No.: US 9,863,663 B2
(45) Date of Patent: Jan. 9, 2018

(54) HEAT EXCHANGER

(75) Inventors: Michael Kohl, Bietigheim (DE);
Karl-Gerd Krumbach, Burgstetten (DE); Thomas Spranger, Stuttgart (DE); Frank-Heiner Schenk, Remseck (DE)

(73) Assignee: MAHLE INTERNATIONAL GMBH, Stuttgart (DE)

(*) Notice: Subject to any disclaimer, the term of this patent is extended or adjusted under 35 U.S.C. 154(b) by 359 days.

(21) Appl. No.: 14/125,173

(22) PCT Filed: Jun. 19, 2012

(86) PCT No.: PCT/EP2012/061693
§ 371 (c)(1),
(2), (4) Date: Feb. 27, 2014

(87) PCT Pub. No.: WO2012/175488
PCT Pub. Date: Dec. 27, 2012

(65) Prior Publication Data
US 2014/0169776 A1    Jun. 19, 2014

(30) Foreign Application Priority Data
Jun. 21, 2011  (DE) .................. 10 2011 077 922

(51) Int. Cl.
*F24H 1/10*    (2006.01)
*F24H 1/18*    (2006.01)
(Continued)

(52) U.S. Cl.
CPC ............... *F24H 9/12* (2013.01); *B23P 15/26* (2013.01); *B60H 1/2225* (2013.01);
(Continued)

(58) Field of Classification Search
CPC ..... B23P 15/26; B60H 1/2225; F24H 3/0429; F24H 3/081; F24H 9/1872; H05B 3/50
(Continued)

(56) References Cited

U.S. PATENT DOCUMENTS

| 4,147,927 A * | 4/1979 | Pirotte ................. A45D 1/28 219/241 |
| 4,327,282 A | 4/1982 | Nauerth |

(Continued)

FOREIGN PATENT DOCUMENTS

| DE | 39 42 266 C1 | 3/1991 |
| DE | 10 2006 018 150 A1 | 11/2007 |

(Continued)

OTHER PUBLICATIONS

International Search Report, PCT/EP2012/061693, dated Jun. 5, 2013, 2 pgs.

(Continued)

*Primary Examiner* — David Angwin
*Assistant Examiner* — Gyounghyun Bae
(74) *Attorney, Agent, or Firm* — Paul D. Strain, Esq.; Strain & Strain PLLC

(57) ABSTRACT

Disclosed herein is a heat exchanger, comprising at least one electric resistance heating element, at least two conductors which are connected to the at least one electric resistance heating element in an electrically conductive manner in order to conduct electric current through the at least one electric resistance heating element and thereby heat the electric resistance heating element, at least one thermally conductive element for transferring heat from the at least one electric resistance heating element to a fluid to be heated, at least one electrically insulating element, which electrically insulates the at least two conductors, and at least one pipe, wherein the at least two conductors and the at least (Continued)

one electric resistance heating element are arranged within a cavity bounded by the pipe and the pipe lies on the at least one electrically insulating element under a compressive force at at least one contact surface.

7 Claims, 10 Drawing Sheets

(51) Int. Cl.
| | |
|---|---|
| A47J 27/00 | (2006.01) |
| A47J 31/54 | (2006.01) |
| H01C 7/02 | (2006.01) |
| H05B 3/12 | (2006.01) |
| H05B 1/02 | (2006.01) |
| H05B 3/06 | (2006.01) |
| F24H 9/12 | (2006.01) |
| B23P 15/26 | (2006.01) |
| B60H 1/22 | (2006.01) |
| F24H 3/08 | (2006.01) |
| F24H 9/18 | (2006.01) |
| H05B 3/50 | (2006.01) |
| F24H 3/04 | (2006.01) |

(52) U.S. Cl.
CPC ........... *F24H 3/0429* (2013.01); *F24H 3/081* (2013.01); *F24H 9/1872* (2013.01); *H05B 3/50* (2013.01); *F24H 2250/04* (2013.01); *H05B 2203/02* (2013.01); *H05B 2203/024* (2013.01); *Y10T 29/49083* (2015.01)

(58) Field of Classification Search
USPC .................................. 29/611; 392/485, 486
See application file for complete search history.

(56) References Cited

U.S. PATENT DOCUMENTS

| | | | | |
|---|---|---|---|---|
| 4,331,861 | A * | 5/1982 | Meixner | H01C 1/1406 219/505 |
| 4,942,289 | A * | 7/1990 | Roller | H05B 3/14 219/504 |
| 4,972,067 | A * | 11/1990 | Lokar | H05B 3/14 219/505 |
| 5,382,938 | A * | 1/1995 | Hansson | H01C 1/1406 338/114 |
| 5,453,599 | A * | 9/1995 | Hall, Jr. | H05B 3/42 219/538 |
| 6,055,360 | A * | 4/2000 | Inoue | B60H 1/00321 165/151 |
| 6,178,292 | B1 * | 1/2001 | Fukuoka | F24H 1/009 165/175 |
| 6,180,930 | B1 * | 1/2001 | Wu | F24H 3/0429 219/530 |
| 6,411,191 | B1 * | 6/2002 | Shea | H01C 10/10 338/22 R |
| 8,712,227 | B2 * | 4/2014 | Meisiek | F16L 53/008 219/504 |
| 2002/0040899 | A1 | 4/2002 | Chang | |
| 2003/0132222 | A1 * | 7/2003 | Bohlender | F24H 3/0405 219/504 |
| 2004/0104215 | A1 * | 6/2004 | Starck | H05B 3/14 219/534 |
| 2004/0131344 | A1 * | 7/2004 | Zimmer | B01D 1/0017 392/397 |
| 2004/0200830 | A1 * | 10/2004 | Hamburger | H05B 3/14 219/541 |
| 2005/0144896 | A1 * | 7/2005 | Hamburger | H01C 1/01 52/741.1 |
| 2005/0150885 | A1 * | 7/2005 | Angermann | F24H 3/0429 219/208 |
| 2009/0107985 | A1 * | 4/2009 | Mori | H05B 3/50 219/534 |
| 2009/0314764 | A1 * | 12/2009 | Mori | F24H 3/0405 219/520 |
| 2010/0282729 | A1 * | 11/2010 | Taguchi | H05B 3/50 219/202 |
| 2011/0186564 | A1 * | 8/2011 | Lauth | H05B 3/42 219/548 |
| 2011/0297666 | A1 * | 12/2011 | Ihle | H05B 3/141 219/538 |

FOREIGN PATENT DOCUMENTS

| | | | | |
|---|---|---|---|---|
| DE | 102011017108 A1 * | 10/2012 | | ............... F16B 2/245 |
| EP | 0 340 550 A2 | 11/1989 | | |
| EP | 0 573 691 A1 | 12/1993 | | |
| EP | 1 545 157 A2 | 6/2005 | | |
| EP | 1 681 906 A1 | 7/2006 | | |
| EP | 1 768 458 A1 | 3/2007 | | |
| JP | 57-195792 U | 12/1982 | | |
| JP | 6297284 A * | 5/1987 | | |
| JP | 64-45082 A | 2/1989 | | |
| JP | 1-313875 A | 12/1989 | | |
| JP | 2007-125967 A | 5/2007 | | |
| JP | WO 2007049746 A1 * | 5/2007 | | ........... F24H 3/0405 |

OTHER PUBLICATIONS

German Search Report, DE 10 2011 077 922.1, dated Nov. 20, 2013, 8 pgs.

* cited by examiner

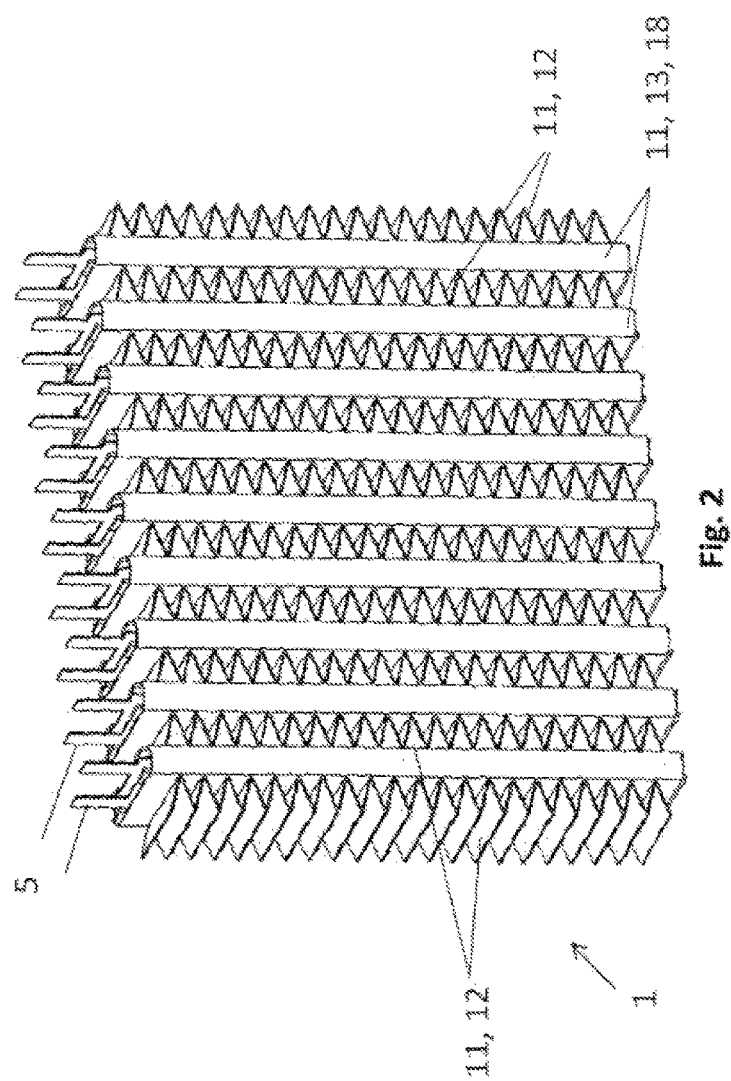

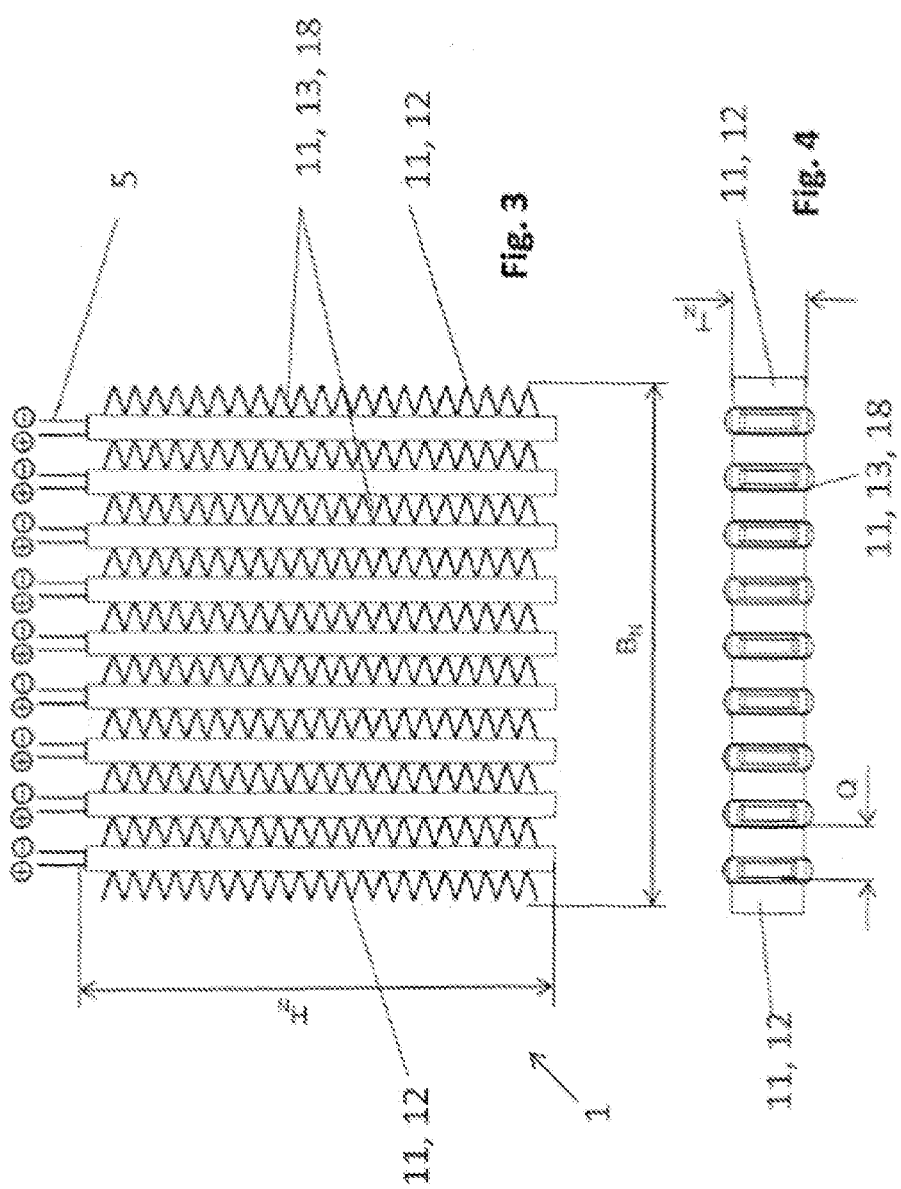

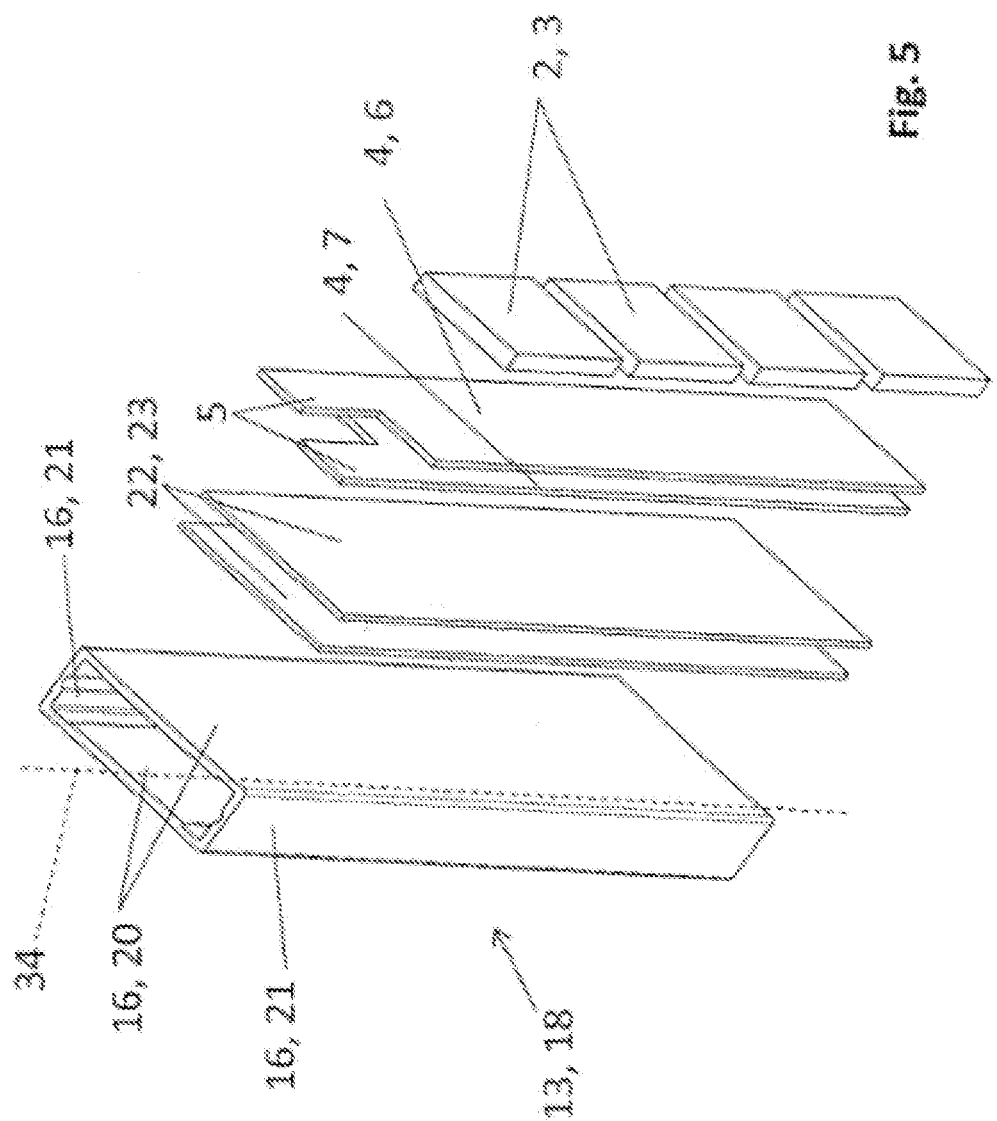

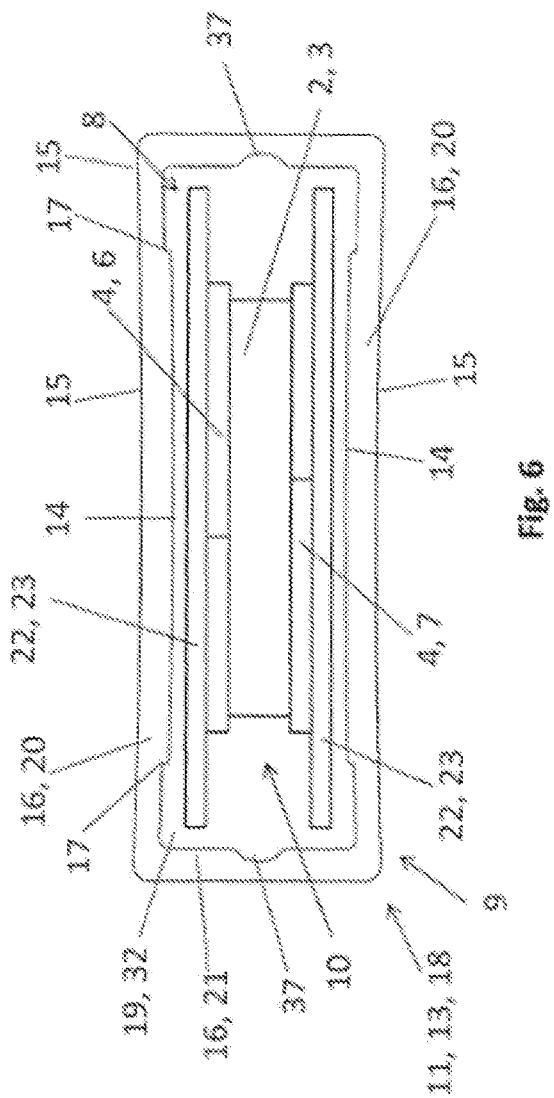

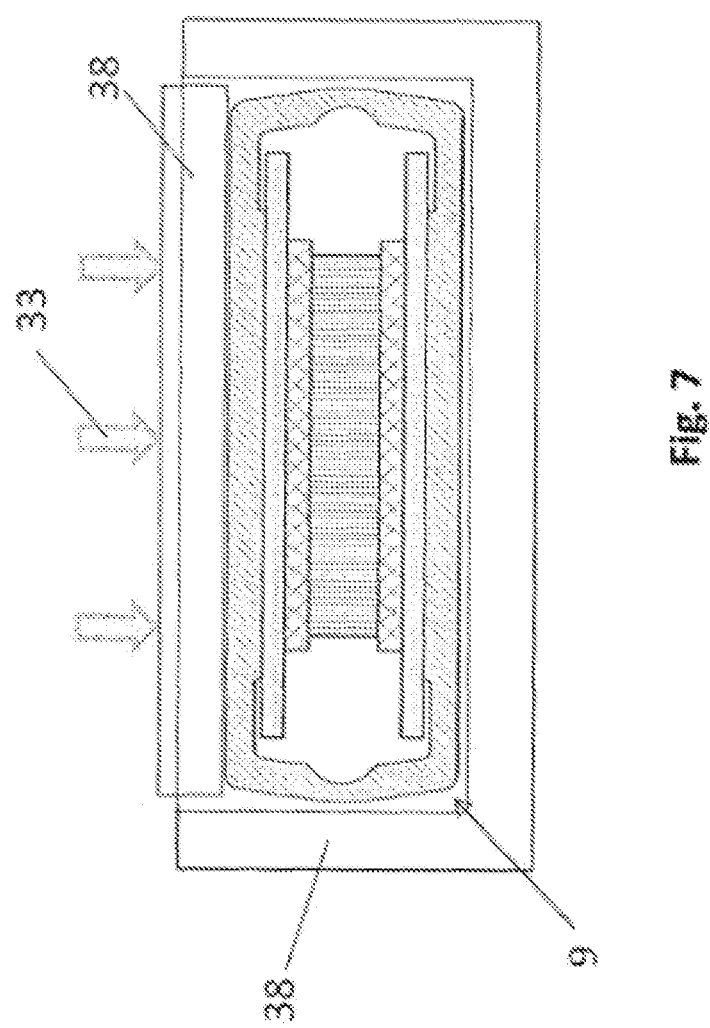

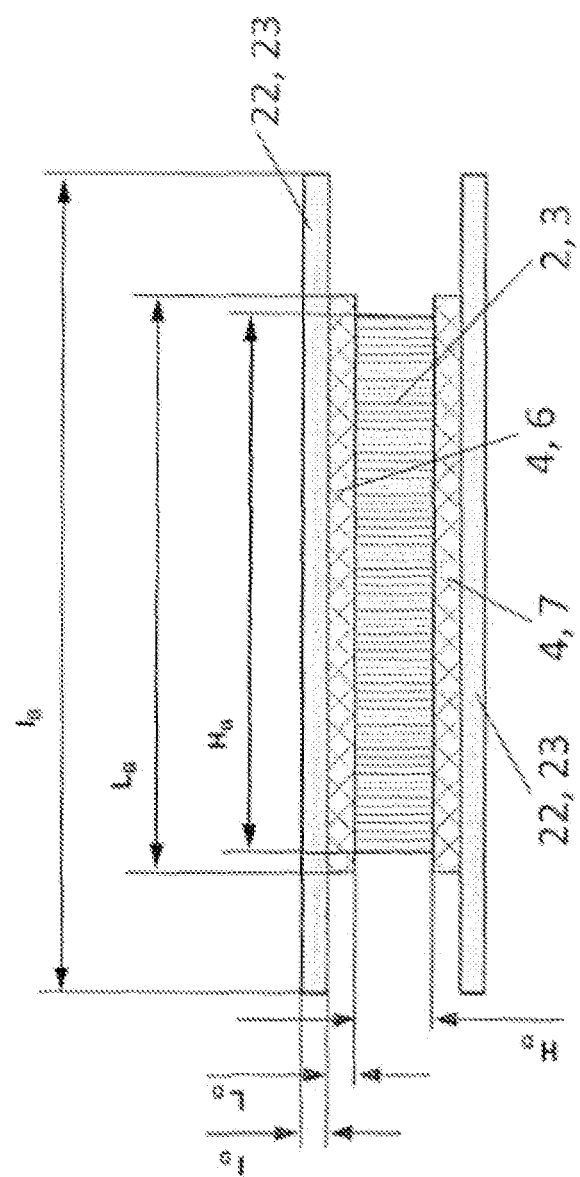

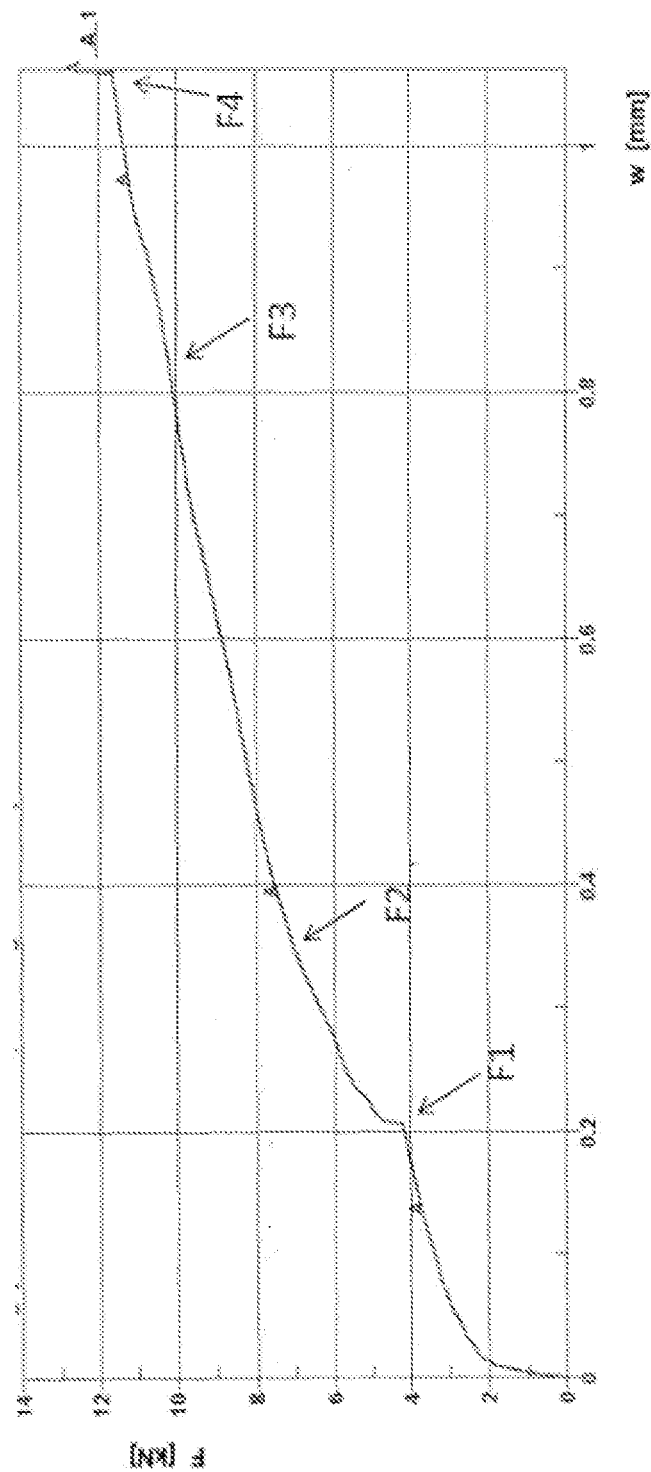

HEAT EXCHANGER

CROSS-REFERENCE TO RELATED PATENT APPLICATIONS

This application is a National Stage of International Application No. PCT/EP2012/061693, filed Jun. 19, 2012, which is based upon and claims the benefit of priority from prior German Patent Application No. 10 2011 077 922.1, filed Jun. 21, 2011, the entire contents of all of which are incorporated herein by reference in their entirety.

The invention relates to a heat exchanger as per the preamble of claim 1, to a motor vehicle air-conditioning system as per the preamble of claim 10, and to a method for producing a heat exchanger or a motor vehicle air-conditioning system, as per the preamble of claim 11.

Motor vehicle air-conditioning systems serve for heating and/or cooling the air to be supplied to the interior of a motor vehicle. In motor vehicle air-conditioning systems, heat exchangers are used as electrical heating devices in order to heat the air that is supplied to the interior. The electrical heating device comprises PTC elements. PTC (Positive Temperature Coefficient) elements are current-conducting materials which exhibit an electrical resistance and which can conduct the current better at relatively low temperatures than at relatively high temperatures. The electrical resistance of said PTC elements thus increases with rising temperature. The PTC element is generally composed of ceramic and is a posistor. In this way, regardless of the boundary conditions—such as, for example, applied voltage, nominal resistance or air flow rate at the PTC element—a highly uniform surface temperature is generated at the PTC element. Overheating, such as could arise, for example, in the case of a normal heat-emitting heating wire, can be prevented, because here, regardless of the boundary conditions, it is always the case that approximately the same resistance is generated, and thus a substantially identical level of electrical heating power is imparted.

The heat exchanger comprises PTC elements, at least two electrical conductors by means of which electrical current is conducted through the PTC element, and heat-conducting elements, in particular lamellae or corrugated fins, by means of which the surface area for heating the air is enlarged. Increasing numbers of motor vehicles are being produced which have an exclusively electrical drive or a hybrid drive. Motor vehicle air-conditioning systems for such vehicles generally no longer have, for heating the air, a heat exchanger which is traversed by a flow of cooling liquid. The entire heating power of the motor vehicle air-conditioning system must thus be imparted by the electrical heating device or the PTC elements. For this reason, it is also necessary for the PTC elements to be operated with high voltage, for example in the range from 50 to 600 V, rather than a low voltage of 12 V. However, high voltage in a motor vehicle air-conditioning system constitutes a safety problem because, for example, if a person comes into contact with parts which are at high voltage, the high voltage can cause harm to the person.

U.S. Pat. No. 4,327,282 presents a heat exchanger with a PTC heating element. Current is conducted through the PTC heating element by means of contact plates, and an insulation layer is arranged on the contact plates. The components are held together by means of a U-shaped clip.

EP 1 768 458 A1 discloses a heat-generating element of a heating device for heating air, comprising at least one PTC element and comprising electrical conductor paths applied to opposite side surfaces of the PTC element, wherein the two electrical conductor paths are surrounded on the outside by an electrically non-conductive insulation layer.

It is thus the object of the present invention to provide a heat exchanger and a motor vehicle air-conditioning system and a method for producing a heat exchanger and a motor vehicle air-conditioning system, with which method a heat exchanger operated with electrical current at high voltage, for example more than 50 V, can be operated without posing a risk to the surroundings, in particular people. The heat exchanger and the motor vehicle air-conditioning system should be inexpensive to produce and should operate reliably.

Said object is achieved by means of a heat exchanger, comprising at least one electrical resistance heating element, in particular at least one PTC element, at least two conductors, in particular conductor plates, connected in electrically conductive fashion to the at least one electrical resistance heating element in order to conduct electrical current through the at least one electrical resistance heating element and thereby heat the electrical resistance heating element, at least one heat-conducting element for transmitting heat from the at least one electrical resistance heating element to a fluid to be heated, at least one electrical insulation element which electrically insulates the at least two conductors, preferably from the at least one heat-conducting element, at least one tube, wherein the at least two conductors and the at least one electrical resistance heating element are arranged within a cavity delimited by the tube, and the tube, at at least one contact surface, lies against the at least one electrical insulation element under the action of a pressure force, wherein the pressure force at the at least one contact surface is variable, in particular the pressure force at the at least one contact surface is greater, preferably by at least 10%, 50% or 100%, in the center than at the edge, and/or the tube, at the at least one contact surface, has a varying thickness in particular perpendicular to a longitudinal axis of the tube and parallel to an imaginary plane spanned by the contact surface, and/or the tube has a greater thickness at the at least one contact surface than outside the at least one contact surface and, owing to said varying thickness, a shoulder is formed on the inside of the tube between the contact surface and outside the contact surface.

In a section perpendicular to a longitudinal axis of the tube, the tube, at the contact surface, is curved before being pressed and deformed against the at least one electrical insulation element and is thereafter of substantially planar form, such that, at the at least one contact surface on the tube, after the latter is pressed against the at least one electrical insulation element, a bending moment is generated as in a leaf spring, and the heating assembly is thereby fastened between the tube with a force fit. During the fastening of the heating assembly to the tube, therefore, there is advantageously no need for a clamping frame, for example, which applies a force to the outside of the tube.

In particular, the at least one tube is in the form of at least one flat tube with two wide side walls and two narrow side walls, and the two narrow side walls are braced by means of a pressure force acting on the two wide side walls at in each case one contact surface, such that a heating assembly with at least one electrical resistance heating element, at least two conductors and at least one electrical insulation element is held with a force fit between the two wide side walls.

In a further embodiment, in a section perpendicular to a longitudinal axis of the tube, the pressure force at the at least one contact surface is lower at the edge than in the center, in particular, the pressure force is greater, by at least 10%, 30%, 50% or 100%, in the center than at the edge.

In a supplementary embodiment, the ratio between the central thickness of the tube at the at least one contact surface and the edge thickness of the tube at the at least one contact surface is greater than or equal to 1.0, and preferably less than 1.5 or 1.2 or 1.1. The greater thickness of the tube centrally at the contact surface than at the edge has the effect that there is a permanent bending stress perpendicular to a longitudinal axis of the tube after the latter has been pressed against the at least one electrical insulation element.

The ratio between the central thickness of the tube at the at least one contact surface and the thickness of the tube outside the contact surface is preferably between 1.1 and 2.0, preferably between 1.1 and 1.5, in particular between 1.2 and 1.7. The tube thus has a shoulder between the contact surface and outside the contact surface, such that in this way, a pressure force is exerted on the at least one electrical insulation element only at the contact surface. Relatively high bending stresses in the at least one electrical insulation element, which is formed in particular as a ceramic plate, can thereby be avoided, and thus a fracture of the ceramic plate can be substantially prevented.

In one variant, the thickness of the tube at the at least one contact surface is between 0.7 mm and 3 mm, preferably between 0.8 mm and 2 mm, in particular between 0.9 mm and 1.7 mm, and/or the tube is provided with a predetermined bending point in particular on the two narrow side walls, wherein the tube preferably has a smaller thickness at the predetermined bending point than outside the predetermined bending point, and/or the two narrow side walls are externally convexly curved and/or the two narrow side walls are arched outward. Before the pressing process in the pressing tool, the tube is of generally planar form at the two narrow side walls, and after said pressing process, the tube is of outwardly curved form at the two narrow side walls. Here, bending of the narrow side walls in the pressing tool takes place substantially at the predetermined bending points with the smaller thickness than outside the predetermined bending point. It is preferable here for the thickness of the tube to be at least 10%, 20%, 30% or 50% smaller at the predetermined bending point than outside the at least one predetermined bending point, in particular at the two narrow side walls.

The at least one heat-conducting element expediently comprises the at least one tube, and/or the at least one heat-conducting element comprises corrugated fins which are arranged externally on the at least one tube in particular by means of brazing or adhesive bonding, and/or the at least two conductors are not in direct contact with the at least one tube, and/or the width of the at least one electrical insulation element is greater than the width of the at least one contact surface of the tube and/or is greater than the width of the at least one conductor in a section perpendicular to the longitudinal axis of the tube.

In a further embodiment, the at least one electrical insulation element is composed at least partially, in particular entirely, of ceramic, and/or the at least one electrical insulation element is of disk-shaped or plate-shaped form, in particular is of rectangular form.

In particular, the at least one electrical resistance heating element, the at least two conductors and the at least one electrical insulation element are connected to form at least one heating assembly, which heating assembly (assemblies) is or are arranged within the at least one tube, and preferably multiple tubes with in each case one heating assembly and with corrugated fins arranged between the tubes form the heat exchanger, wherein in particular, no pressure force is exerted by means of a clamping frame or by means of a spring on the walls of the at least one tube, in particular on the wide side walls of the at least one flat tube.

Motor vehicle air-conditioning system according to the invention, which comprises at least one heat exchanger as described in this property right application.

Method according to the invention for producing a heat exchanger or a motor vehicle air-conditioning system, in particular a heat exchanger as described in this property right application or a motor vehicle air-conditioning system described in this property right application, having the steps: providing at least one electrical resistance heating element, in particular at least one PTC element, providing at least two electrical conductors, in particular conductor plates, for conducting electrical current through the at least one electrical resistance heating element, providing at least one heat-conducting element for transmitting heat from the at least one electrical resistance heating element to a fluid to be heated, providing at least one electrical insulation element for electrically insulating the at least one heat-conducting element from the at least two conductors, connecting the at least two conductors to the at least one electrical resistance heating element, thermally connecting the at least one heat-conducting element to the at least one conductor and/or to the at least one electrical resistance heating element, electrically insulating the at least two conductors, preferably from the at least one heat-conducting element, by means of the at least one electrical insulation element, by virtue of the at least two conductors with the at least one electrical resistance heating element and the at least one electrical insulation element being connected to form at least one heating assembly, wherein the at least one heat-conducting element comprises at least one tube, which at least one tube enclose(s) at least one cavity, the heating assembly is fastened within the cavity in the tube with a force fit by virtue of the tube being deformed and pressed against the heating assembly, in particular against the at least one electrical insulation element, such that the tube is pressed against the heating assembly, in particular against the at least one electrical insulation element, under the action of a pressure force, wherein the tube is deformed, and pressed against the heating assembly, within a pressing tool.

In a further embodiment, the tube with the heating assembly within the cavity is inserted into the pressing tool, the pressing tool is subsequently used to deform and press the tube against the heating assembly and subsequently the tube is removed from the pressing tool, and/or the at least one tube is provided as at least one flat tube and the at least one heating assembly is inserted into the at least one cavity enclosed by the at least one flat tube which has a closed cross section, and subsequently, the flat tube is deformed at the narrow side walls and thus also braced such that the wide side walls of the flat tube are pressed against the heating assembly, in particular against the at least one electrical insulation element, under the action of a pressure force.

In a supplementary variant, in the pressing tool, the tube is deformed and pressed against the heating assembly at at least one contact surface, and owing to a convex curvature of the contact surface in a section perpendicular to a longitudinal axis of the tube, the tube is initially laid and pressed against the heating assembly centrally at the at least one contact surface, and during the further deformation and pressing process in the pressing tool, the at least one contact surface is also laid and pressed at the edge against the heating assembly, and/or the pressing process in the pressing tool is terminated when a predefined limit value of the pressing force is reached.

In a further variant, the two narrow side walls are arched outward, in particular at a predetermined bending point, during the pressing process in the pressing tool.

In a further embodiment, the narrow side walls are deformed at a predetermined bending point, and/or the narrow side walls are deformed by virtue of a pressure force being exerted on the wide side walls by the pressing tool, and/or the tube is provided with a predetermined bending point in particular on the two narrow side walls, wherein preferably, the tube has a smaller thickness at the predetermined bending point than outside the predetermined bending point, and/or the tube, is provided with at least one convex contact surface in particular at the two narrow side walls, and/or the tube is provided so as to be concavely curved externally at a pressing surface, opposite the at least one contact surface, and/or the tube is provided such that the ratio between the central thickness of the tube at the at least one contact surface and the edge thickness of the tube at the at least one contact surface is greater than or equal to 1.0, and preferably less than 1.5 or 1.2 or 1.1, and/or the tube is provided such that the ratio between the central thickness of the tube at the at least one contact surface and the thickness of the tube outside the contact surface is between 1.1 and 2.0, preferably between 1.1 and 1.5, in particular between 1.2 and 1.7, and/or the tube is provided such that the concavity at the pressing surface is between 0.1 and 1.0 mm, and/or the tube is provided such that the central thickness of the tube at the at least one contact surface is less than or equal to 1.5 mm, and/or the tube is provided such that, in a section perpendicular to a longitudinal axis of the tube, the tube is convexly curved at the at least one contact surface, and/or, in a section perpendicular to the longitudinal axis of the tube, the tube is provided such that the tube is concavely curved externally at a pressing surface, opposite the at least one contact surface.

In a supplementary embodiment, the at least one heat-conducting element, in particular the at least one tube and/or the corrugated fins are composed at least partially, in particular entirely, of metal, for example aluminum or steel, or plastic.

The at least one electrical insulation element is preferably arranged between in each case one wall of the at least one tube and a conductor, such that the at least two conductors are electrically insulated with respect to the at least one tube.

In one variant, two preferably substantially rectangular molded seals as electrical insulation elements are arranged in the cavity, or the at least one molded seal is formed in the cavity as a hose, in particular shrink hose. The two substantially rectangular molded seals are in this case clamped between in each case one wide side wall of the at least one flat tube and in each case one conductor plate. Here, the hose, in particular in the form of a shrink hose, which forms the molded seal surrounds the heating unit with the two conductor plates and the PTC elements. In this way, the heating unit is electrically insulated.

The at least one molded seal is expediently elastic, and/or the at least one molded seal is composed at least partially of silicone or plastic or rubber, and/or the at least one molded seal is a foil. In a further embodiment, the at least one molded seal comprises heat-transmitting or heat-conducting particles, for example aluminum oxide and/or silicon carbide and/or boron nitride.

In a further embodiment, the at least one tube is produced as at least one flat tube, and the at least one heating assembly is inserted into the at least one cavity enclosed by the at least one flat tube which has a closed cross section, and subsequently, the flat tube is deformed at the narrow side walls by a pressing tool and thus also braced such that the wide side walls of the flat tube are pressed against the at least one electrical insulation element.

In a supplementary variant, during the insertion of the at least one heating assembly into the at least one cavity, the thickness of the at least one cavity between the two wide side walls is greater than the thickness of the heating assembly between the electrical insulation elements on the at least two conductors. The thickness of the heating assembly is preferably measured perpendicular to a plane spanned by the conductor plates.

In a further variant, after the insertion of the at least one heating assembly into the at least one cavity, the shape of the wall of the tube is changed, in particular arched and/or braced, such that the volume of the at least one cavity is reduced and, preferably, the heating assembly is thereby connected to the wide side walls of the at least one flat tube with a force fit.

In a further embodiment, the at least one molded seal is a foil or insulation foil, for example a polyimide foil (Kapton foil), an (elastically) ceramically filled foil or an (elastically) ceramically filled silicone foil.

In an additional variant, the heat exchanger has an IP protection class of 67, such that it exhibits adequate impermeability with regard to water and with regard to dust.

In a further embodiment, the corrugated fins and the at least one tube are connected to one another by means of adhesive bonding and/or brazing and/or with a force fit under preload.

In a further embodiment, the at least one heat-conducting element and/or the at least one electrical insulation element has a thermal conductivity of at least 0.5 W/mK, in particular at least 10 W/mK.

In a further embodiment, the at least one electrical insulation element exhibits electrical insulation of at least 1 kV/mm, in particular at least 15 kV/mm.

In one variant, the at least one electrical insulation element has, preferably in cross section, a dielectric strength of at least 1 kV.

In a further embodiment, the at least one electrical insulation element exhibits thermal conductivity of at least 0.5 W/mK, in particular at least 10 W/mK. The at least one electrical insulation element can thus firstly provide good electrical insulation, and can secondly conduct the heat from the electrical resistance heating element to the heat-conducting element or to the heat-conducting elements with adequate effectiveness.

An exemplary embodiment of the invention will be described in more detail below with reference to the appended drawings, in which:

FIG. 2 shows a perspective view of a heat exchanger,

FIG. 3 shows a side view of the heat exchanger as per FIG. 2,

FIG. 4 shows a plan view of the heat exchanger as per FIG. 2,

Figure 8:
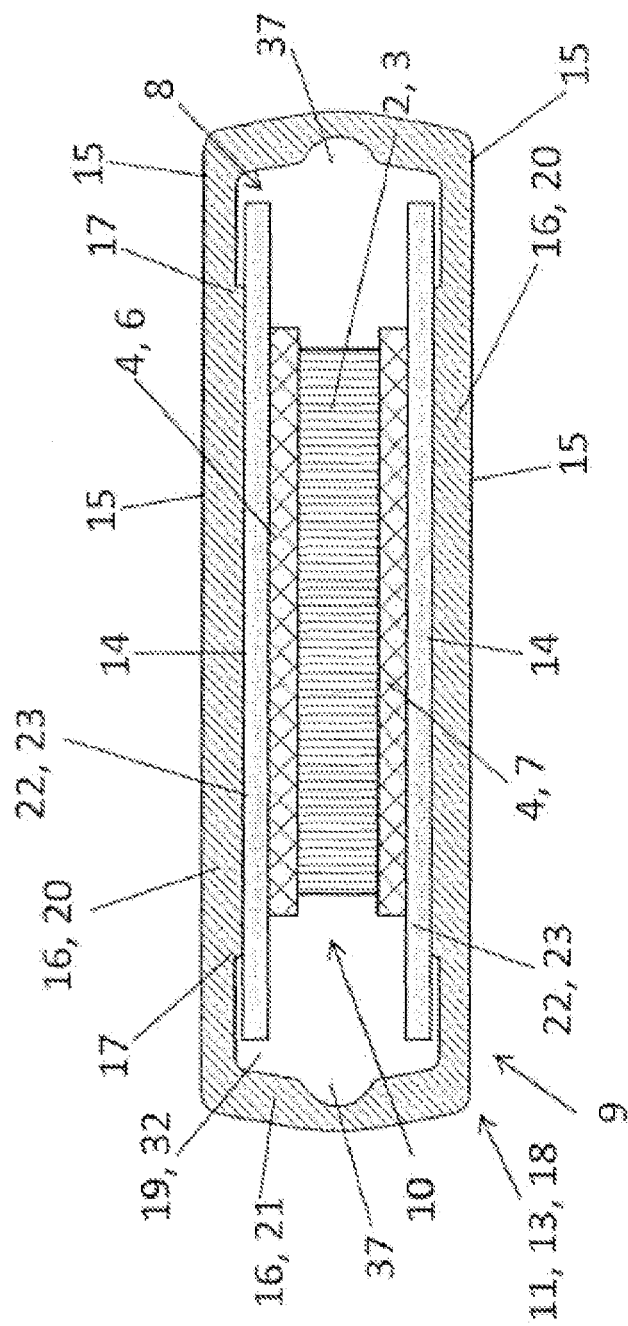
Figure 9:
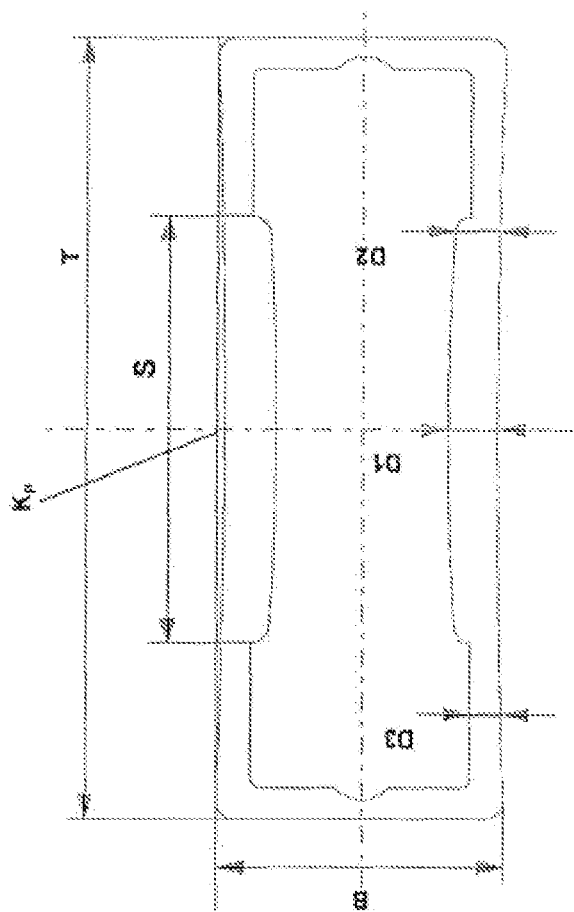

FIG. 5 shows an exploded illustration of a heating register of the heat exchanger as per FIG. 2, FIG. 6 shows a cross section through the heating register of the heat exchanger as per FIG. 2 before a deformation process in a pressing tool, FIG. 7 shows a cross section of the heating register in the pressing tool, FIG. 8 shows a cross section through the heating register of the heat exchanger as per FIG. 2 after the deformation in the pressing tool, FIG. 9 shows a cross section through a flat tube of the heating register before the deformation in the pressing tool, FIG. 10 shows a cross section through a heating assembly of the heating register, and FIG. 11 shows a force-travel diagram of a deformation of the flat tube in the pressing tool.

Figure 1:
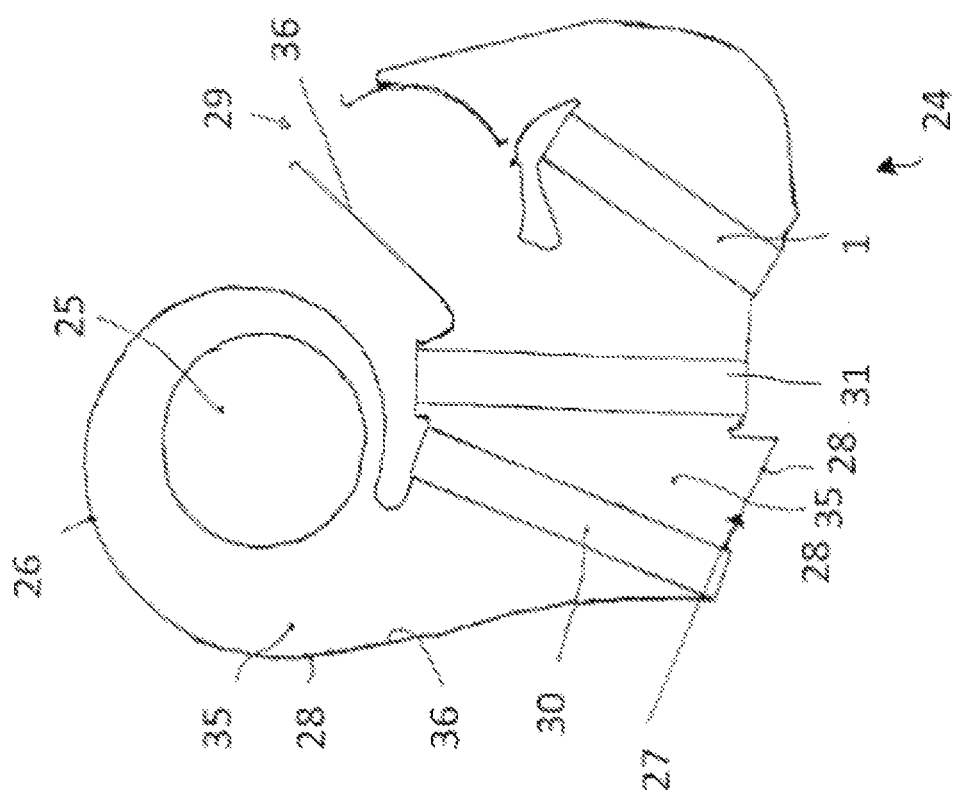
FIG. 1 shows a cross section of a motor vehicle air-conditioning system.

FIG. 1 shows a motor vehicle air-conditioning system 24. A blower 25, an air filter 30, a refrigerant evaporator 31 and a heat exchanger 1 as an electrical heating device are arranged in an air-conditioning system housing 26 with a base wall 27 and an outlet section 29. The air-conditioning system housing 26 thus forms a duct 35 for conducting the air. Housing walls 28 of the air-conditioning system housing 26 have a surface 36 on the inner side, which surfaces delimit the duct 35. The air for the interior of a motor vehicle is conducted through the air filter 30, through the refrigerant evaporator 31 and through the heat exchanger 1 by means of the blower 25.

Thus, for heating the air conducted through the motor vehicle system 24, the motor vehicle air-conditioning system 24 is not provided with a heat exchanger traversed by a flow of coolant. The air conducted through the motor vehicle air-conditioning system 24 is exclusively electrically heated by means of the heat exchanger 1. The motor vehicle air-conditioning system 24 is preferably used in a motor vehicle with an exclusively electrical drive or with a hybrid drive (not illustrated). To achieve the required electrical heating power by means of the heat exchanger 1, the heat exchanger 1 must be operated with high voltage, for example with more than 50 V, for example with 60 V or 600 V, in order that no excessively large currents flow and thus no excessively thick current lines (not illustrated) need to be used.

FIGS. 2 to 10 illustrate an exemplary embodiment of the heat exchanger 1 for the motor vehicle air-conditioning system 24. A tube 18 in the form of a flat tube 13 composed of aluminum with a longitudinal axis 34 has two wide side walls 20 and two narrow side walls 21 (FIGS. 5, 6 and 8). Here, the wide and narrow side walls 20, 21 constitute walls 16 which enclose a cavity 19 within the tube 18. Here, the walls 18 have no joint, for example tongue-and-groove connection, weld point or brazing point, in cross section. The tube 18 is produced in unipartite form as a closed wall 18 by means of extrusion, such that no joints are required on the tube 18 in cross section.

Two ceramic plates 23 as electrical insulation elements 22 are arranged within the flat tube 13. Two conductors 4, specifically a first conductor plate 6 and a second conductor plate 7, lie on the two rectangular ceramic plates 23 (which may be provided with notches) (FIGS. 6, 7 and 8). Three electrical resistance heating elements 2 in the form of PTC elements 3 are arranged between the two conductor plates 6, 7. The PTC elements 3 are in this case connected to one another via the two conductor plates 6, 7 by means of adhesive. On the two conductors 4, there are formed in each case one electrical contact plate 5 (FIGS. 2, 3 and 5). The cavity 19 enclosed by the walls 16 of the flat tube 13 is an empty space in the region of the narrow side walls 21, that is to say only air is situated in the empty space 32 (FIG. 8).

In this way, the two conductor plates 6, 7 with the three PTC elements 3 arranged in between are electrically insulated owing to the electrical insulation of the ceramic plates 23. The electrical contacting of the two conductor plates 6, 7 is realized by means of electrical lines (not illustrated) on the contact plates 5. Here, the two conductor plates 6, 7 with the three PTC elements 3 constitute a heating unit 10. After the two ceramic plates 23 are arranged on the heating unit 10, these form a heating assembly 8. The insertion of the heating assembly 8 into the flat tubes 13 with the corrugated fins 12 yields a heating register 9, or the heat exchanger 1. Multiple heating registers 9 as per the illustration in FIGS. 2, 3 and 4 may also be connected to one another so as to form a heat exchanger 1 with a relatively large number of heating registers 9.

The mesh height $H_N$ of the heat exchanger 1 as per the illustration in FIGS. 3 and 4 is approximately 50 to 300 mm, preferably 100 to 200 mm, and the mesh width $B_N$ is approximately 50 to 300 mm, preferably 100 to 200 mm. The transverse separation Q, that is to say the spacing between the flat tubes 13 as per the illustration in FIG. 4, is in this case between 5 and 30 mm, preferably 7 to 18 mm, and the structural depth $T_N$ as per the illustration in FIG. 4 is 6 to 50 mm, preferably 10 to 40 mm.

Corrugated fins 12 as heat-conducting elements 11 are arranged between the flat tubes 13 (FIGS. 2 and 3). The corrugated fins 12 serve in this case to enlarge the surface area of the heat exchanger 1 in order that the heat released by the PTC elements 3 can be dissipated more effectively to the air flowing through the heat exchanger 1. Here, the flat tubes 13 also constitute heat-conducting elements 11. The heating assembly 8 composed of the two conductor plates 6, 7, the PTC elements 3 and the ceramic plates 23 is in this case first inserted into the flat tube 13 after the flat tube 13 has been produced. The corrugated fins 12 are connected after the insertion of the heating assembly 8 into the flat tube 13 with the corrugated fins 12. Here, the corrugated fins 12 may be connected to the flat tubes 13 for example by means of adhesive bonding, welding or brazing. Furthermore, it is also possible for the corrugated fins 12 to be connected to the flat tubes 13 with a force fit by way of a frame (not illustrated).

Here, all of the flat tubes 13 of the heat exchanger 1 are sealed off, so as to be impermeable with regard to dust and with regard to liquid, with respect to the surroundings of the heat exchanger 1, for example by means of cover plates on the top and bottom ends of the flat tubes (not illustrated) and/or by means of a sealing compound, for example a silicone seal. It is thus not possible for liquid or dust to penetrate into the conductor plates 6, 7 or to the PTC elements 3 within the cavity 19. The heat exchanger 1 arranged within the duct 35 of the motor vehicle air-conditioning system 24 is thus sealed off so as to be impermeable with regard to dust and with regard to liquid. Dust or liquid within the duct 35 thus cannot penetrate into the cavity 19 within the flat tubes 13.

FIG. 6 illustrates the heating register 9, and FIG. 9 illustrates only the flat tube 13, before the deformation and pressing process in a pressing tool 38. In FIG. 8, the heating register 9 is illustrated after the removal from the pressing tool 38 and the deformation and pressing of the flat tube 13. The flat tube 13 is formed, on the inside, with a contact surface 14 on the two wide side walls 20. Here, the thickness of the tube 18 is greater at the contact surface 14 than outside the contact surface 14, such that a shoulder 17 is formed on the inside of the flat tube 13 between the contact surface 14 and outside the contact surface 14. On the outside of the flat tube 13, a pressing surface 15 is provided, opposite the two contact surfaces 14, on the wide side walls 20. Furthermore, a predetermined bending point 37 is provided on the two narrow side walls 21. Here, the tube width B is between 4 mm and 10 mm, preferably between 5 mm and 8 mm, and the tube depth T is between 10 mm and 50 mm, preferably between 18 mm and 35 mm. The ratio between the tube depth T and the tube width B in the unpressed state as per FIGS. 6 and 9 is approximately 3, though may also lie between 2 and 5.5. The ratio between the tube depth T and the tube width B in the pressed state as per FIG. 8, after removal from the pressing tool 38, is approximately 3.3, though may also lie in the range between 2.5 and 6. As per the illustration in FIGS. 6 and 9, before the insertion into the pressing tool 38, the two wide side walls 20 are, in the sections as per FIGS. 6 to 9, curved inwardly perpendicular to the longitudinal axis 34 of the tube 13, such that the two wide side walls 20 are concavely curved on the outside and are convexly curved on the inside; in particular, owing to the different thicknesses of the tube 18 at the contact surface 14, a more pronounced convex form of the contact surface 14 perpendicular to the longitudinal axis 34 is provided. The spacing between the two contact surfaces 14 as per FIG. 6 before the insertion into the pressing tool 38 is in this case greater than the thickness of the heating assembly 8, such that the heating assembly 8 can be inserted into the tube 18 simply without relatively high forces.

The central thickness $D_1$ of the flat tube 13 is 1.0 mm, and the edge thickness $D_2$ of the flat tube 13 at the contact surface 14 is 0.95 mm. As a result, the ratio between the central thickness $D_1$ and the edge thickness $D_2$ is greater than 1, that is to say is 1.05. The thickness $D_3$ of the tube 18 outside the contact surface 14 is 0.8 mm, such that the ratio of $D_1$ to $D_3$ is 1.25. By contrast to this exemplary embodiment with a ratio $D_1$ to $D_3$ of 1.25, it is also possible in a further exemplary embodiment for $D_1$ to lie between 1.0 mm and 1.2 mm, and for $D_2$ to lie between 1.0 mm and 1.2 mm, giving a ratio $D_1$ to $D_2$ of 1.0. In this case, $D_3$ is 0.8 mm, and the ratio $D_1$ to $D_3$ lies between 1.25 and 1.5. In an additional exemplary embodiment which is not illustrated, $D_1$ and $D_2$ are in each case 1.5 mm, such that the ratio $D_1$ to $D_2$ is 1.0, and $D_3$ has a thickness of 1.0 mm, such that the ratio of $D_1$ to $D_3$ is 1.5. The width S of the contact surface 14 is, in all of the exemplary embodiments, greater than the width $L_B$ of the conductor plates 6, 7 and smaller than the width $I_B$ of the electrical insulation element 22. The width $H_B$ of the electrical resistance heating element 2 is smaller than the width $L_B$ of the conductor plates 6, 7 (FIG. 10). Furthermore, the width $I_B$ of the electrical insulation element 22 is 2 mm to 8 mm greater than the width $L_B$ of the conductor plates 6, 7 in order that no electrical sparkover from the conductor plates 6, 7 to the flat tube 13 is possible. Before the deformation in the pressing tool 38, the flat tube 13 has an external concavity $K_p$ of 0.2 mm. The external concavity $K_p$ is the vertical difference between an imaginary straight line parallel to the plane of the drawing of FIG. 9, which straight line rests on the wide side wall 20 from the outside, and the center of the pressing surface 15. It is preferable here for the external concavity $K_p$ to be between 0.05 mm and 0.5 mm. The thickness $I_D$ of the electrical insulation element 22 is between 0.3 mm and 1.5 mm, the thickness $L_D$ of the conductor plates 6, 7 is between 0.3 mm and 1.0 mm, and the thickness $H_D$ of the electrical resistance heating element 2 lies between 1 mm and 3 mm, preferably between 1.5 mm and 2.5 mm (FIG. 10).

Following the insertion of the heating register 9 into the pressing tool 38, a pressure force 33 is exerted on the two wide side walls 20 of the flat tube 13 by the pressing tool 38. Here, before the insertion of the flat tube 13, the two narrow side walls 21 are, as per the illustration in FIG. 6, oriented substantially perpendicular to the two wide side walls 20. In FIG. 11, the travel of the pressing tool 38 perpendicular to a plane spanned by the two wide side walls 20 is plotted on the abscissa, and the force 33 exerted on the tube 18 by the pressing tool is plotted, in kN, on the ordinate. At the start of the pressing process, up to a travel of approximately 0.2 mm, or up to the first force section F1 of approximately 4 kN, the two narrow side walls 21 are deformed outwardly substantially at the two predetermined bending points 37. Initial contact of the contact surface 14, that is to say of the upper contact surface 14 as per the illustrations in FIGS. 6 and 7, with the upper electrical insulation element 22 occurs at the second force section F2, and approximately 7 kN. From the third force section F3, of approximately 10 kN, onward, the flat tube 13 no longer has an external concavity $K_p$ on the outside. The two wide side walls 20 have thus been deformed outward, such that at the two wide side walls 20 in the section perpendicular to the longitudinal axis 34 as per FIGS. 7 and 8, there is a bending moment, and thus also a bending stress, at the two wide side walls 20. The two wide side walls 20 are thus preloaded in the manner of a leaf spring, and the heating assembly 8 is thus connected to the two wide side walls 20 with a force fit between the two wide side walls 20. Here, said pressure force is exerted by the two wide side walls 20 on the two electrical insulation elements 22, in the form of ceramic plates 23, only at the contact surface 14. The width S of the contact surface 14 is in this case only slightly greater than the width $I_B$ of the ceramic plate 23, such that substantially no bending moments and bending stresses arise at the brittle and hard ceramic plate 23 because the ceramic plate 23 is subjected substantially only to a pressure force between the contact surface 14 and the two conductor plates 6, 7. As a result of the exertion of a pressure force on the outside of the two wide side walls 20 at the pressing surfaces 5, it is thus firstly possible for the two narrow side walls 21 to be deformed outward, and furthermore, the two wide side walls 20 are pressed against the two ceramic plates 23 owing to a bending moment and/or a bending stress in the two wide side walls 20, such that said ceramic plates, as a heating assembly 8, are held between the two wide side walls 20 with a force fit. This advantageously means that no clamping frame is required on the outside of the heat exchanger 1 in order to fasten the heating assembly 8 in the flat tube 13 with a force fit.

A sudden change in force occurs in the fourth force section F4. In the fourth force section F4, the pressing tool 38 has pressed the flat tube 13 fully against the heating assembly 8, such that a flow of the material of the flat tube 13 and also for example of the electrical conductor plates 6, 7 occurs from a central region of the contact surface 14 to an edge region of the contact surface 14. Between the third force section F3 of approximately 10 kN and the fourth force section F4 of approximately 11.5 kN, the pressing process can be terminated. From the force section F3 onward, the flat tube 13 no longer has an external concavity Kp on the outside. As a result, the fin can be connected evenly to the flat tube.

Likewise, from the force section F3 onward, an adequate contact surface is provided between the flat tube and ceramic plate (23). Contact between the two contact surfaces 14 and the electrical insulation element 22 in the form of ceramic plates 23 over as large an area as possible is necessary in order that the heat generated by the PTC elements 3 can be transmitted to the flat tube 13 over as large a heat-conducting area as possible. The pressing process in the pressing tool 38 is thus terminated when a predefined limit value of the pressing force, for example at 11 kN±0.3 kN, is reached.

Viewed as a whole, the heat exchanger 1 according to the invention is associated with substantial advantages. The two narrow side walls 21 are of curved form before the pressing process in the pressing tool 38 and, in the pressing tool 38, owing to the planar form of the two ceramic plates 23, are deformed into planar shape such that bending moments and a bending stress arise at the two wide side walls 20, which bending moments and bending stress exert a pressure force on the heating assembly 8 at the contact surface 14, the heating assembly 8 thereby being fastened to the flat tube 13 with a force fit. The pressure forces exerted on the ceramic plates 23 by the contact surface 14 are in this case significantly greater in the center than the edge, because, in a section perpendicular to the longitudinal axis 34 of the flat tube 13, the bending stress and the bending moment are greater in the center than at the edge. The two wide side walls 20 thus act as a leaf spring which is elastically preloaded, such that the two wide side walls 20 act as an elastic spring element.

LIST OF REFERENCE SIGNS

1 Heat exchanger
2 Electrical resistance heating element
3 PTC element
4 Conductor
5 Electrical contact plate
6 First conductor plate
7 Second conductor plate
8 Heating assembly
9 Heating register
10 Heating unit
11 Heat-conducting element
12 Corrugated fins
13 Flat tube
14 Contact surface
15 Pressing surface
16 Walls of the tube
17 Shoulder
18 Tube
19 Cavity
20 Wide side wall
21 Narrow side wall
22 Electrical insulation element
23 Ceramic plate
24 Motor vehicle air-conditioning system
25 Blower
26 Air-conditioning system housing
27 Base wall
28 Housing wall
29 Outlet section
30 Filter
31 Refrigerant evaporator
32 Empty space within the flat tube
33 Pressing force
34 Longitudinal axis
35 Duct
36 Surface
37 Predetermined bending point
38 Pressing tool
$H_N$ Mesh height
$B_N$ Mesh width
Q Transverse separation
$T_N$ Structural depth
B Tube width
T Tube depth
S Width of the contact surface
F1 First force section
F2 Second force section
F3 Third force section
F4 Fourth force section
$K_p$ External concavity
$I_B$ Width of the insulation element
$L_B$ Width of the conductor plates
$H_B$ Width of the heating element
$I_D$ Thickness of the insulation element
$L_D$ Thickness of the conductor plates
$H_D$ Thickness of the heating element
$D_1$ Central thickness of the tube at the contact surface
$D_2$ Edge thickness of the tube at the contact surface
$D_3$ Thickness of the tube outside the contact surface

The invention claimed is:
1. A PTC heat exchanger comprising
at least one PTC electrical resistance heating element,
at least two conductors comprising conductor plates, connected in electrically conductive fashion to the at least one PTC electrical resistance heating element in order to conduct electrical current through the at least one PTC electrical resistance heating element and thereby heat the PTC electrical resistance heating element,
at least one heat-conducting element for transmitting heat from the at least one PTC electrical resistance heating element to a fluid to be heated,
at least one electrical insulation element which electrically insulates the at least two conductors,
at least one tube having a tube width, two wide side walls each having a wide side wall thickness, and two narrow side walls each having a narrow side wall thickness, wherein
the at least two conductors and the at least one PTC electrical resistance heating element are arranged within a cavity delimited by the tube,
wherein the tube, at least one contact surface, lies against the at least one electrical insulation element under the action of a pressure force, wherein the at least one contact surface abuts at least one of the two wide side walls,
wherein the pressure force at the at least one contact surface is variable across the at least one contact surface,
wherein, the pressure force at the at least one contact surface is greater by at least 10% in the center than at the edge,
wherein the wide side wall thickness at the at least one contact surface varies perpendicular to a longitudinal axis of the tube and parallel to an imaginary plane spanned by the at least one contact surface, wherein a varying wide side wall thickness is provided such that the wide side wall thickness at the at least one contact surface is greater than the wide side wall thickness outside the at least one contact surface and, and, owing to said varying wide side wall thickness, a shoulder is formed on the inside of the tube between the at least one contact surface and outside the at least one contact surface,
wherein the wide side wall thickness at the at least one contact surface is between 0.7 mm and 3 mm,
wherein the tube is provided with a predetermined bending point in particular on the two narrow side walls,
wherein the narrow side wall thickness at the predetermined bending point is less than the narrow side wall thickness outside the predetermined bending point,
wherein the two narrow side walls are externally convexly curved or the two narrow side walls are arched outward, wherein the ratio between the central wide side wall thickness at the at least one contact surface and the wide side wall thickness outside the at least one contact surface is greater than or equal to 1.0 and less than 1.5.

2. A PTC heat exchanger comprising
at least one PTC electrical resistance heating element,
at least two conductors comprising conductor plates, connected in electrically conductive fashion to the at least one PTC electrical resistance heating element in order to conduct electrical current through the at least one PTC electrical resistance heating element and thereby heat the PTC electrical resistance heating element,
at least one heat-conducting element for transmitting heat from the at least one PTC electrical resistance heating element to a fluid to be heated,
at least one electrical insulation element which electrically insulates the at least two conductors,
at least one tube having a tube width, two wide side walls each having a wide side wall thickness, and two narrow side walls each having a narrow side wall thickness, wherein
the at least two conductors and the at least one PTC electrical resistance heating element are arranged within a cavity delimited by the tube,
wherein the tube, at least one contact surface, lies against the at least one electrical insulation element under the action of a pressure force, wherein the at least one contact surface abuts at least one of the two wide side walls,
wherein the pressure force at the at least one contact surface is variable across the at least one contact surface,
wherein, the pressure force at the at least one contact surface is greater by at least 10% in the center than at the edge,
wherein the wide side wall thickness at the at least one contact surface varies perpendicular to a longitudinal axis of the tube and parallel to an imaginary plane spanned by the at least one contact surface, wherein a varying wide side wall thickness is provided such that the wide side wall thickness at the at least one contact surface is greater than the wide side wall thickness outside the at least one contact surface and, owing to said varying wide side wall thickness, a shoulder is formed on the inside of the tube between the at least one contact surface and outside the at least one contact surface,
wherein the wide side wall thickness at the at least one contact surface is between 0.7 mm and 3 mm,
wherein the tube is provided with a predetermined bending point in particular on the two narrow side walls,
wherein the narrow side wall thickness at the predetermined bending point is less than the narrow side wall thickness outside the predetermined bending point,
wherein the two narrow side walls are externally convexly curved or the two narrow side walls are arched outward,
wherein the ratio between the central wide side wall thickness at the at least one contact surface and the wide side wall thickness outside the at least one contact surface is between 1.1 and 2.0.

3. The PTC heat exchanger as claimed in claim 2, wherein the ratio between the central wide side wall thickness at the at least one contact surface and the wide side wall thickness outside the at least one contact surface is between 1.1 and 1.5.

4. The PTC heat exchanger as claimed in claim 2, wherein the ratio between the central wide side wall thickness at the at least one contact surface and the wide side wall thickness outside the at least one contact surface is between 1.2 and 1.7.

5. A method for producing a PTC heat exchanger according to claim 1, the method comprising:
providing at least one PTC electrical resistance heating element,
providing at least two electrical conductors comprising conductor plates, for conducting electrical current through the at least one PTC electrical resistance heating element,
providing at least one heat-conducting element for transmitting heat from the at least one PTC electrical resistance heating element to a fluid to be heated,
providing at least one electrical insulation element for electrically insulating the at least one heat-conducting element from the at least two conductors,
connecting the at least two conductors to the at least one PTC electrical resistance heating element,
thermally connecting the at least one heat-conducting element to the at least one conductor or to the at least one PTC electrical resistance heating element,
electrically insulating the at least two conductors by using the at least one electrical insulation element, by virtue of the at least two conductors with the at least one PTC electrical resistance heating element and the at least one electrical insulation element being connected to form at least one heating assembly,
wherein the at least one heat-conducting element comprises at least one tube having a tube width, two wide side walls each having a wide side wall thickness, and two narrow side walls each having a narrow side wall thickness, wherein the at least one tube encloses at least one cavity,
wherein the at least one heating assembly is fastened within the at least one cavity in the at least one tube with a force fit by deforming the at least one tube and pressing the at least one tube against the heating assembly, such that the at least one tube is pressed against the heating assembly, under the action of a pressure force,
wherein the at least one tube is deformed, and pressed against the heating assembly, within a pressing tool,
wherein the narrow side walls are deformed at a predetermined bending point, and
wherein the narrow side walls are deformed by virtue of the pressure force being exerted on the wide side walls by the pressing tool, and
wherein the at least one tube is provided with the predetermined bending point on the two narrow side walls, and
wherein, the narrow side wall thickness at the predetermined bending point is less than the narrow side wall thickness outside the predetermined bending point, and
wherein the at least one tube is provided with at least one convex contact surface at the two narrow side walls, and
wherein the at least one tube is provided so as to be concavely curved externally at a pressing surface, opposite the at least one convex contact surface, and
wherein the at least one tube is provided such that the ratio between a central wide side wall thickness at the at least one convex contact surface and an edge wide side wall thickness at the at least one convex contact surface is greater than or equal to 1.0, and less than 1.5, and wherein the at least one tube is provided such that the ratio between the central wide side wall thickness at the at least one convex contact surface and wide side wall thickness outside the at least one convex contact surface is between 1.1 and 2.0, and wherein the at least one tube is provided such that the concavity at the pressing surface is between 0.1 and 1.0 mm, and wherein the at least one tube is provided such that the central wide side wall thickness at the at least one convex contact surface is less than 1.5 mm, and wherein the at least one tube is provided such that, in a section perpendicular to a longitudinal axis of the at least one tube, the at least one tube is convexly curved at the at least one convex contact surface, and wherein in a section perpendicular to the longitudinal axis of the at least one tube, the at least one tube is provided such that the at least one tube is concavely curved externally at a pressing surface, opposite the at least one convex contact surface.

6. The method as claimed in claim 5, wherein the ratio between the central wide side wall thickness at the at least one convex contact surface and the wide side wall thickness outside the at least one convex contact surface area is between 1.1 and 1.5.

7. The method as claimed in claim 5, wherein the ratio between the central wide side wall thickness at the at least one convex contact surface and the wide side wall thickness outside the at least one convex contact surface area is between 1.2 and 1.7.

* * * * *